(12) United States Patent
Huh

(10) Patent No.: US 10,239,486 B2
(45) Date of Patent: *Mar. 26, 2019

(54) INTELLIGENT RETRACTOR HAVING NOISE REMOVAL UNIT

(71) Applicant: WOOSHIN SAFETY SYSTEMS CO., LTD., Hwaseong-si (KR)

(72) Inventor: Woo Young Huh, Seoul (KR)

(73) Assignee: WOOSHIN SAFETY SYSTEMS CO., LTD., Hwaseong-si (KR)

( * ) Notice: Subject to any disclaimer, the term of this patent is extended or adjusted under 35 U.S.C. 154(b) by 77 days.

This patent is subject to a terminal disclaimer.

(21) Appl. No.: 15/407,665

(22) Filed: Jan. 17, 2017

(65) Prior Publication Data

US 2017/0341623 A1  Nov. 30, 2017

(30) Foreign Application Priority Data

May 25, 2016 (KR) .......................... 10-2016-0064040

(51) Int. Cl.
*B60R 22/34* (2006.01)
*B60R 22/36* (2006.01)
*B60R 22/405* (2006.01)

(52) U.S. Cl.
CPC .............. *B60R 22/34* (2013.01); *B60R 22/36* (2013.01); *B60R 22/405* (2013.01)

(58) Field of Classification Search
CPC ....... B60R 22/34; B60R 22/36; B60R 22/343; B60R 22/405
See application file for complete search history.

(56) References Cited

U.S. PATENT DOCUMENTS

| 5,938,138 | A | * | 8/1999 | Sumiyashiki | ......... | B60R 22/415 |
| | | | | | | 242/382.2 |
| 2006/0055226 | A1 | * | 3/2006 | Ver Hoven | ........... | B60R 22/415 |
| | | | | | | 297/463.2 |
| 2016/0347275 | A1 | * | 12/2016 | Hodatsu | ................. | B60R 22/34 |
| 2017/0341624 | A1 | * | 11/2017 | Huh | ...................... | B60R 22/405 |

FOREIGN PATENT DOCUMENTS

| CN | 1843811 | 10/2006 |
| CN | 101678815 | 3/2010 |
| CN | 204586775 | 8/2015 |
| CN | 205010171 | 2/2016 |
| JP | 10217911 | 8/1998 |
| KR | 20020043411 | 6/2002 |
| KR | 20060051257 | 5/2006 |

* cited by examiner

Primary Examiner — Sang K Kim
(74) Attorney, Agent, or Firm — Cantor Colburn LLP

(57) ABSTRACT

An intelligent retractor having a noise removal unit includes: a spool around which webbing is wound; a flywheel which is provided at one side of the spool and rotates along with the rotation of the spool; a locking unit which fixes the flywheel when a predetermined condition for preventing an extension of the webbing is satisfied; and a noise removal unit which rotates along with the rotation of the flywheel when the webbing is retracted, and prevents vibration from being generated in the locking unit.

12 Claims, 17 Drawing Sheets

INTELLIGENT RETRACTOR HAVING NOISE REMOVAL UNIT

TECHNICAL FIELD

The present invention relates to a retractor for a seat belt, and more particularly, to an intelligent retractor capable of implementing various functions in an integrated manner by using a simple structure.

BACKGROUND ART

Various types of safety devices are provided to prevent an occupant seated in a vehicle or a machine from being catapulted out of the vehicle or the machine due to a collision between vehicles or a collision with other objects.

A seat belt is the representative safety device among the safety devices, and a lower abdomen and a chest of the occupant seated in the vehicle or the machine are stably fixed to the seat by using the seat belt.

A retractor, which serves to fix a user's body by pulling webbing with appropriate retracting force in a state in which the user fastens the seat belt and to prevent the retracted webbing from being extended again in a specific situation such as an accident, is widely applied.

The retractor may have various functions such as an automatic locking retractor function, a block out function, and an emergency locking retractor function.

The automatic locking retractor (ALR) function refers to a function in which when the user extends an overall length of the webbing, an automatic locking function is performed such that the webbing is not extended any further and the webbing may just be retracted, for example, like a method that mounts an infant seat into a vehicle or mount a device into a seat, and then restricts the infant seat or the device.

The block out (B/O) function refers to a function that detects a gradient of a vehicle body, and prevents an operation of a tilt sensor, when the vehicle body is tilted at a predetermined angle or greater, by operating a locking mechanism in order to forcedly release a function of inhibiting the webbing from being extended. The block out function refers to a function for preventing a situation in which the seat cannot return back to an original state as the seat mounted with the retractor is folded and tilted at a predetermined angle or greater and the locking mechanism is operated.

The emergency locking retractor (ELR) function refers to a function in which a locking mechanism for the retractor prevents the webbing from being released in the case of emergency such as a case in which impact is applied to the vehicle or a rollover accident occurs.

However, because constituent elements capable of implementing the automatic locking retractor function, the block out function, and the emergency locking retractor function are different from one another, it is very difficult for a single retractor to implement all of these functions.

However, with the technology development, models, which implement all of these functions by using a single retractor, have been developed and used, but the models in the related art have problems in that noise of a ball member embedded in the locking mechanism are not removed, and structures of the models are very complicated because the number of components of the retractor is increased.

Recently, as regulations regarding safety evaluation become stricter, there is a need for development of technologies for adjusting severity of injury according to the occupants by classifying the occupants into adult persons, old or weak persons, female persons, and children and adjusting a mechanism for deploying an airbag. To this end, it is necessary to essentially develop a system for identifying occupants by specifying the occupants' bodies.

SUMMARY OF THE INVENTION

The present invention has been made in an effort to provide an intelligent retractor capable of having a reduced overall size and a simple structure, being easily manufactured, implementing various functions by a single retractor, preventing noise caused by rattling, caused by vibration in a vehicle, of a locking unit that constitutes the retractor, and identifying occupants.

Technical problems of the present invention are not limited to the aforementioned technical problems, and other technical problems, which are not mentioned above, may be clearly understood by those skilled in the art from the following descriptions.

An exemplary embodiment of the present invention provides an intelligent retractor having a noise removal unit, the intelligent retractor including: a spool around which webbing is wound; a flywheel which is provided at one side of the spool and rotates along with the rotation of the spool; a locking unit which fixes the flywheel when a predetermined condition for preventing an extension of the webbing is satisfied; and a noise removal unit which rotates along with the rotation of the flywheel when the webbing is retracted, and prevents vibration from being generated in the locking unit.

First gear teeth may be formed at a circumference of the flywheel, the locking unit may include a housing, and a locking lever rotatably provided in the housing, and may fix the flywheel as the locking lever is caught by the first gear teeth when the predetermined condition for preventing an extension of the webbing is satisfied, and the noise removal unit may rotate along with the rotation of the flywheel when the webbing is retracted, and may press the locking lever so as to prevent vibration from being generated in the locking unit.

Second gear teeth may be formed at a circumference of the flywheel, and the noise removal unit may include a rotating gear which meshes with the second gear teeth, and a pressing member which presses the locking lever by the rotation of the rotating gear.

The noise removal unit may further include a magnetic portion which is connected to the rotating gear and rotates together with the rotating gear, and the pressing member may include a pressing portion which extends to press the locking lever, and a tension generating portion which is made of a magnetic material and disposed to be adjacent to the magnetic portion so as to generate tension.

The tension generating portion may be connected to the pressing portion at an inclined angle.

An end of the pressing portion may be formed to be rounded, and a pressed portion, which corresponds to the shape of the end of the pressing portion, may be formed on an upper surface of the locking lever.

The intelligent retractor may further include a mode switching lever which rotates in a state in which the webbing is extended by a predetermined length or larger, and operates the locking unit so that the locking unit fixes the flywheel.

The intelligent retractor may further include an auxiliary rotating unit which rotates the mode switching lever in a state in which the webbing is extended by the predetermined length or larger.

The mode switching lever may include a switching protrusion, and the auxiliary rotating unit may include a rotating member which shares the same rotation axis with the flywheel and rotates along with the rotation of the flywheel, and a disc member which rotates the mode switching lever by pushing the switching protrusion in accordance with a rotation angle of the auxiliary rotating member.

The locking unit may further include a ball member which is provided between the housing and the locking lever, and may rotate the locking lever in accordance with a gradient of a vehicle so that the locking lever is caught by the first gear teeth, and the locking lever may have a depressed portion which is depressed such that a part of the ball member is inserted into the depressed portion.

The depressed portion may include a pressing protrusion which is formed to come into point-to-point contact with the ball member, and forms a gap between the locking lever and the ball member.

The locking unit may further include a coupling member which includes an inclined portion that is detachably provided at one side of the housing and formed to be inclined with respect to a horizontal state of the housing.

The intelligent retractor having the noise removal unit according to the exemplary embodiment of the present invention may effectively prevent noise, which is inevitably generated in the locking unit of the retractor due to vibration and rattling of the vehicle, by restricting rattling of the ball member when the webbing is retracted, and may allow an emergency locking function to be normally performed when the webbing is extended.

With the single retractor, it is possible to implement various functions such as an automatic locking retractor function, an emergency locking retractor function, and a function of detecting an occupant's body size, and to reduce a weight and a size because of a simple structure.

The effects of the present invention are not limited to the aforementioned effects, and other effects, which are not mentioned above, will be clearly understood by those skilled in the art from the claims.

DETAILED DESCRIPTION

Figure 1:
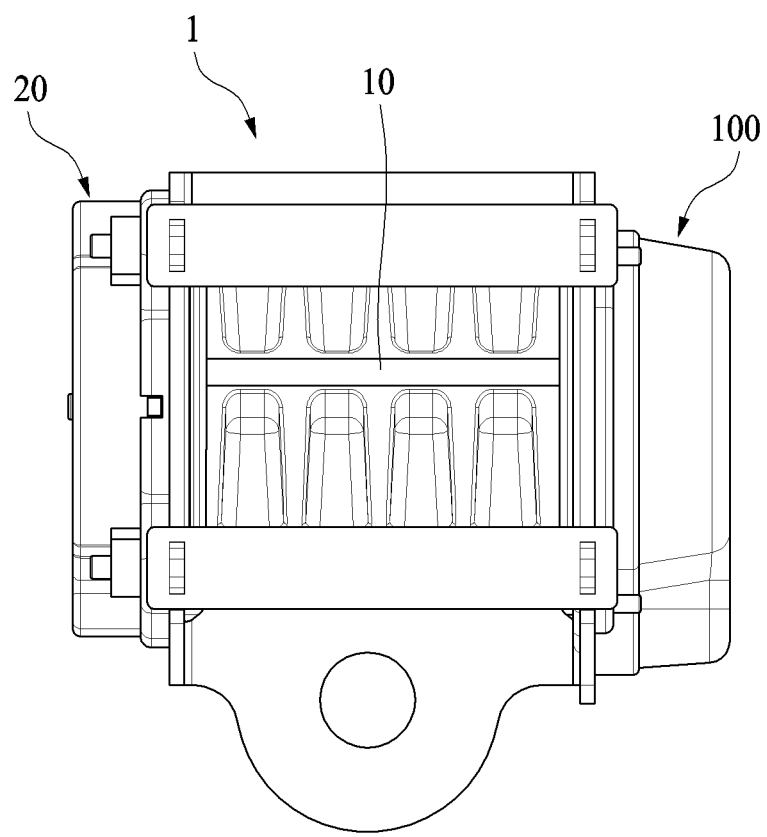
FIG. 1 is a view illustrating an external appearance of an intelligent retractor according to an exemplary embodiment of the present invention.

Hereinafter, an exemplary embodiment of the present invention for specifically accomplishing the objects of the present invention will be described with reference to the accompanying drawings. In the description of the present exemplary embodiment, like terms and like reference numerals are used for like configurations, and additional descriptions will be omitted.

FIG. 1 is a view illustrating an external appearance of an intelligent retractor 1 according to an exemplary embodiment of the present invention.

As illustrated in FIG. 1, the intelligent retractor 1 according to an exemplary embodiment of the present invention includes a spool 10 around which webbing is wound, and an integrated function module 100 is positioned at one side of the spool 10. The integrated function module 100 serves to implement various functions such as an automatic locking retractor function, an emergency locking retractor function, and a function of detecting an occupant's body size.

In the case of the present exemplary embodiment, a restoring module 20, which provides restoring force for rotating the spool in the reverse direction in order to wind the extended webbing again, is provided at the opposite side of the integrated function module 100, but the configuration is selective, and is not limited by the present exemplary embodiment. For example, a pretensioner or the like may be provided in addition to the restoring module 20.

Hereinafter, the integrated function module 100, which is the subject matter of the present invention, will be described in detail.

Figure 2:
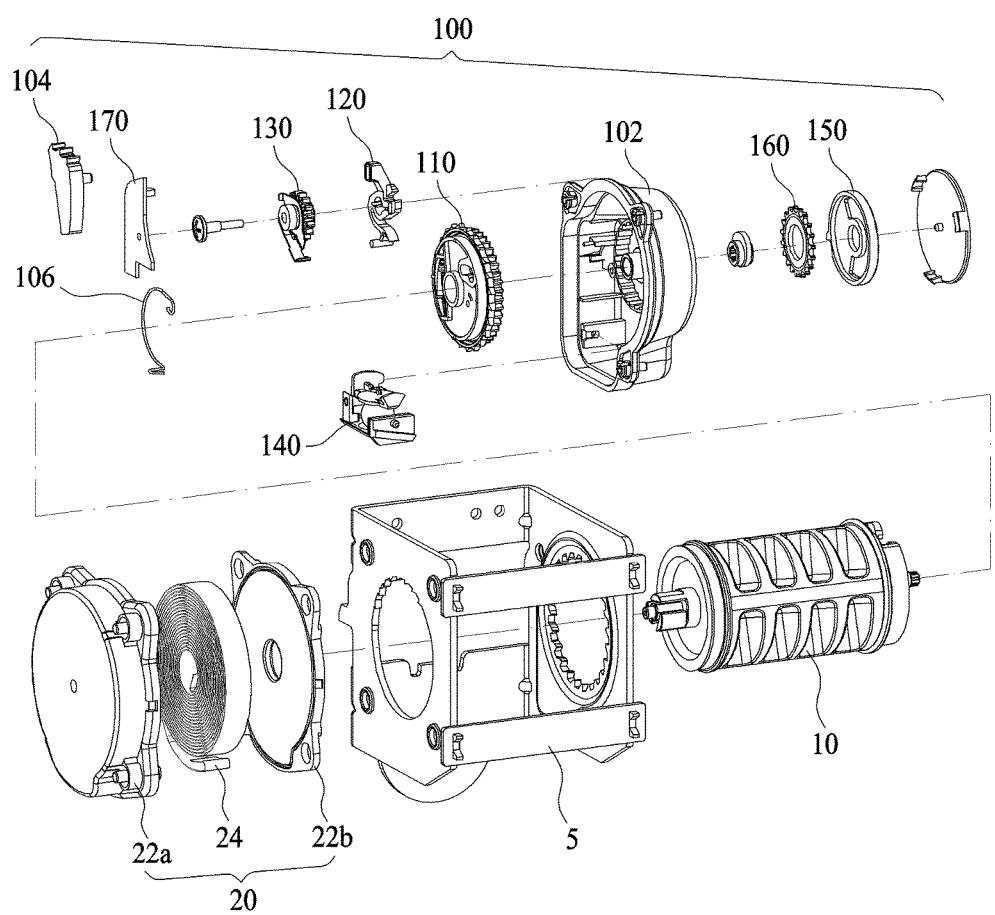
FIG. 2 is a view illustrating a state in which constituent elements of the intelligent retractor according to the exemplary embodiment of the present invention are disassembled.

FIG. 2 is a view illustrating a state in which constituent elements of the intelligent retractor according to the exemplary embodiment of the present invention are disassembled.

As illustrated in FIG. 2, the intelligent retractor according to the exemplary embodiment of the present invention includes a frame 5, and the spool 10 is rotatably coupled into the frame.

The restoring module 20 provided at the other side of the spool 10 includes a restoring spring 24, and an outer cover 22a and an inner cover 22b which surround the restoring spring 24.

The integrated function module 100 is provided at one side of the spool 10, and in the present exemplary embodiment, the integrated function module 100 includes a flywheel 110, a locking unit 140, a mode switching lever 120, a noise removal unit 130, a sensing unit 170, and an auxiliary rotating unit including a rotating member 160 and a disc member 150. In addition, the respective constituent elements are accommodated in a main cover 102.

In the main cover 102, a pawl member 104, which selectively meshes with gear teeth of the frame 5, and a restoring member 106, which restores the pawl member 104, may be provided, and because these constituent elements are typical, a description thereof will be omitted, and the respective constituent elements of the integrated function module 100 will be described in detail below.

Figure 3:
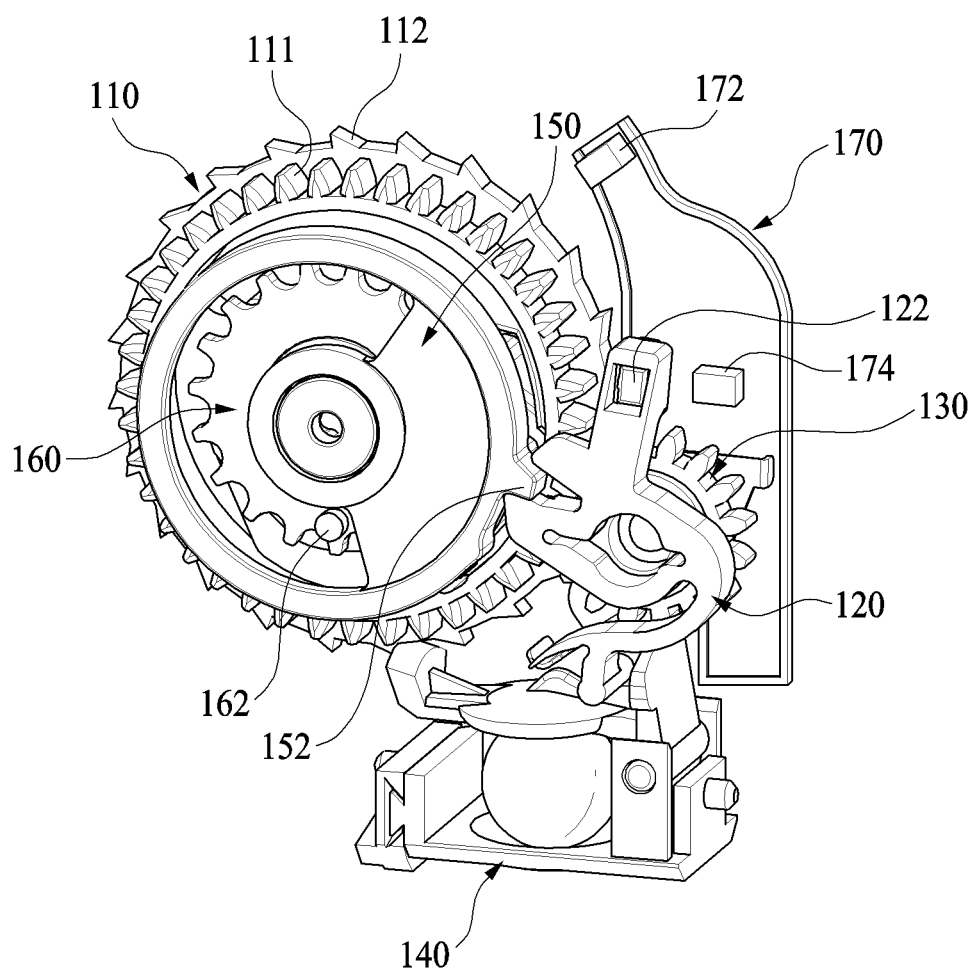
FIG. 3 is a view illustrating a state in which the constituent elements of the intelligent retractor according to the exemplary embodiment of the present invention are coupled.
Figure 4:
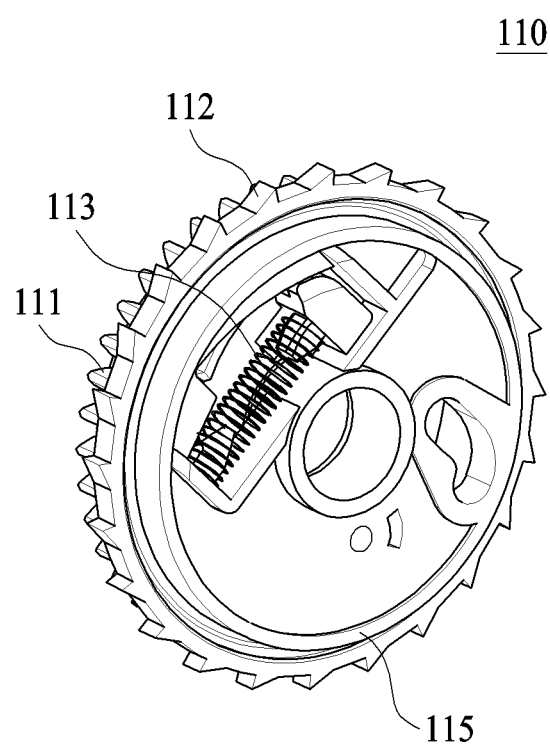
FIGS. 4 and 5 are views illustrating an appearance of a flywheel of the intelligent retractor according to the exemplary embodiment of the present invention.
Figure 5:
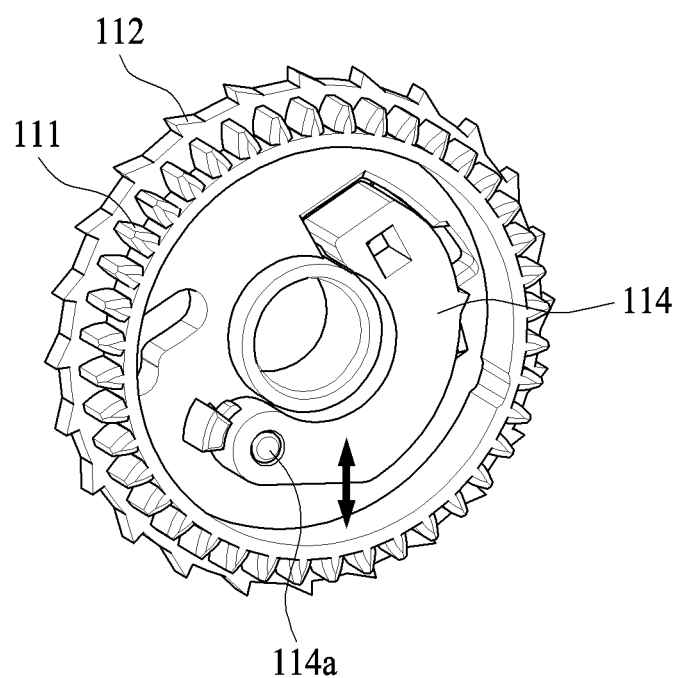

Referring to FIGS. 3 to 5, the flywheel 110 is provided at one side of the spool 10 (see FIG. 2), and rotates along with the rotation of the spool 10. Further, in the present exemplary embodiment, first gear teeth 112, second gear teeth 111, and a second target means 115 are formed at a circumference of the flywheel 110. Specifically, the first gear teeth 112 are provided between the second gear teeth 111 and the second target means 115, and an outer diameter of a second gear is always greater than an outer diameter of a first gear.

The flywheel 110 includes an inertial member 114 which rotates about a rotation shaft 114a by inertia when the flywheel 110 rotates, and an elastic member 113 which restores the inertial member 114. When the webbing is rapidly extended, the inertial member 114 rotates to allow the pawl member 104 to mesh with the gear teeth of the frame 5 (see FIG. 2) and serves to prevent the webbing from being extended.

As illustrated in FIG. 3, the auxiliary rotating unit includes the rotating member 160 and the disc member 150.

The rotating member 160 shares the same rotation axis with the flywheel 110, and is formed to be rotatable along with the rotation of the flywheel 110, and the disc member 150 is formed to be selectively rotatable in accordance with a rotation angle of the auxiliary rotating member 160.

In the present exemplary embodiment, a partial region of the disc member 150 is opened, and the remaining region of the disc member 150 is shielded. In this case, the auxiliary rotating member 160 has a catching protrusion 162, and the catching protrusion 162 is exposed to the opened region of the disc member 150.

Therefore, in a case in which the auxiliary rotating member 160 rotates and the catching protrusion 162 is caught by the shielded region of the disc member 150, the disc member 150 may rotate together with the auxiliary rotating member 160. That is, the disc member 150 rotates when the disc member 150 comes into contact with the catching protrusion 162 and receives external force, but in a state in which the disc member 150 is not in contact with the catching protrusion 162, the disc member 150 is not affected by the auxiliary rotating member 160.

A protruding portion 152, which protrudes outward, is formed on an outer circumferential surface of the disc member 150, and the protruding portion 152 may be connected to the mode switching lever 120. The reason why the auxiliary rotating unit is provided as described above is to switch an ALR mode and an ELR mode by rotating the mode switching lever 120 in a state in which the webbing is extended by a predetermined length or greater, and the configuration thereof will be described below.

Figure 8:
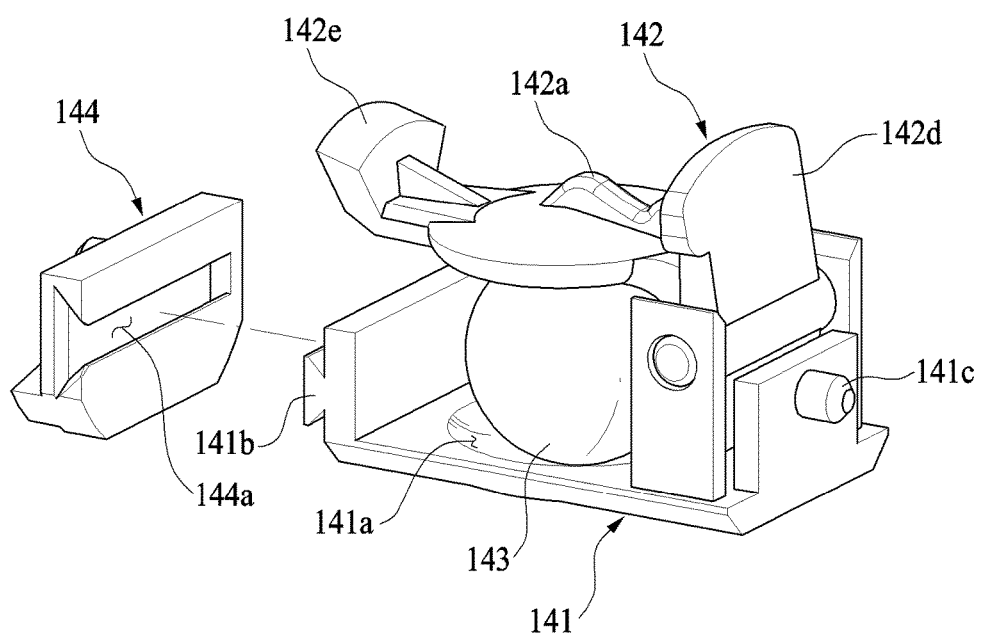
FIGS. 8 to 11 are views illustrating a structure of a locking unit of the intelligent retractor according to the exemplary embodiment of the present invention.
Figure 9:
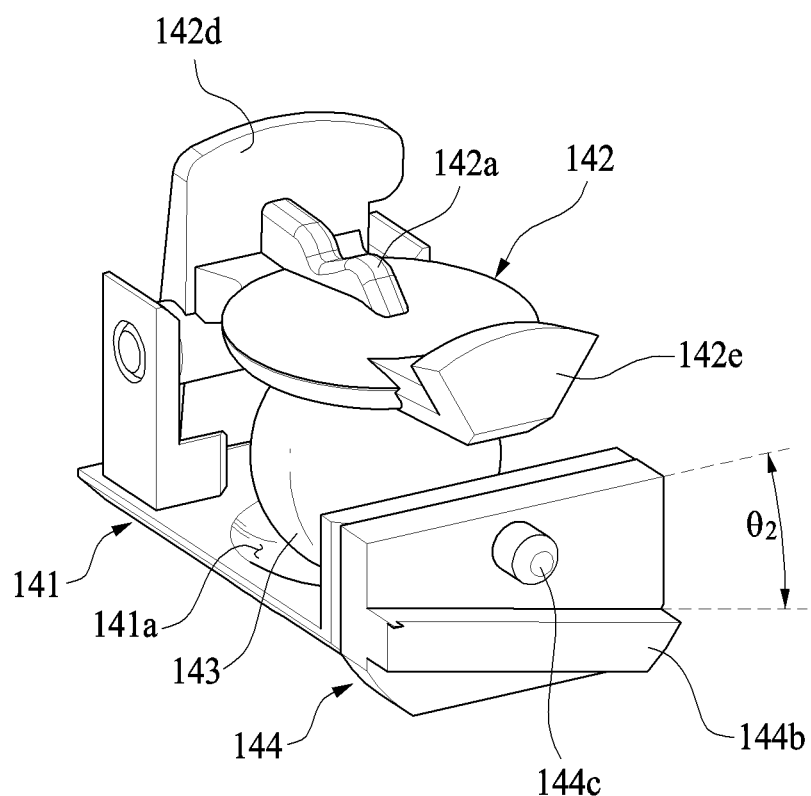

Next, a structure of the noise removal unit 130 will be described with reference to FIGS. 3 and 6. The noise removal unit 130 prevents vibration of a ball member 143 (see FIG. 8) included in the locking unit 140, when the webbing is retracted, by pressing a pressed portion 142a formed on a locking lever 142 (see FIG. 8) of the locking unit 140, which will be described below, in order to prevent vibration of the ball member 143.

To this end, the noise removal unit 130 includes a rotating gear 131 which has external gear teeth 131a that mesh with the second gear teeth 111 of the flywheel 110, a pressing member 132 which presses the locking lever 142 by the rotation of the rotating gear 131, and a magnetic portion 136 which is connected with the rotating gear 131 through a through hole 133 of the pressing member 132 and has gear teeth 137 that mesh with internal gear teeth 131b of the rotating gear 131 so that the magnetic portion 136 may rotate together with the rotating gear 131.

In particular, in the present exemplary embodiment, the pressing member 132 is formed to be rotatable independently of the rotating gear 131, and particularly, the pressing member 132 includes a pressing portion 135 which extends in an elongated manner so as to press the locking lever 142, a tension generating portion 135a which is made of a magnetic material and disposed to be adjacent to the magnetic portion 136 to generate tension, and a stopper portion 134 which restricts a rotation amount of the noise removal unit 130.

In this case, the tension generating portion 135a may be connected to the pressing portion 135 by being inclined at a predetermined angle θ1, and thus the tension generating portion 135a is disposed to be adjacent to the magnetic portion 136 so as to generate torque by using magnetic force and/or tension of the tension generating portion 135a included in the pressing member 132.

That is, when the rotating gear 131 rotates, the pressing member 132 having the aforementioned structure may rotate together with the rotating gear 131 by magnetic force of the magnetic portion 136 and/or tension of the pressing member 132, but the rotating gear 131 idles at a predetermined rotation angle or greater and is in a state independent of the rotation of the rotating gear 131. This configuration is to allow the spool 10 to continuously rotate to wind/unwind the webbing, and after a point in time at which the pressing portion 135 comes into contact with the locking lever 142, the pressing member 132 is independent of the rotation of the rotating gear 131, and allow the rotating gear 131 to continuously rotate, thereby making it possible to maintain the rotation of the spool 10. Accordingly, it is also possible to obtain an effect of preventing the pressing portion 135 from applying excessive pressure to the locking lever 142.

Meanwhile, an end of the pressing portion 135 may be formed to be rounded, and the reason is to prevent the occurrence of engagement trouble between the pressing portion 135 and the pressed portion 142a when the pressing portion 135 presses the locking lever 142 in order to prevent vibration of the ball member 143.

Figure 7:
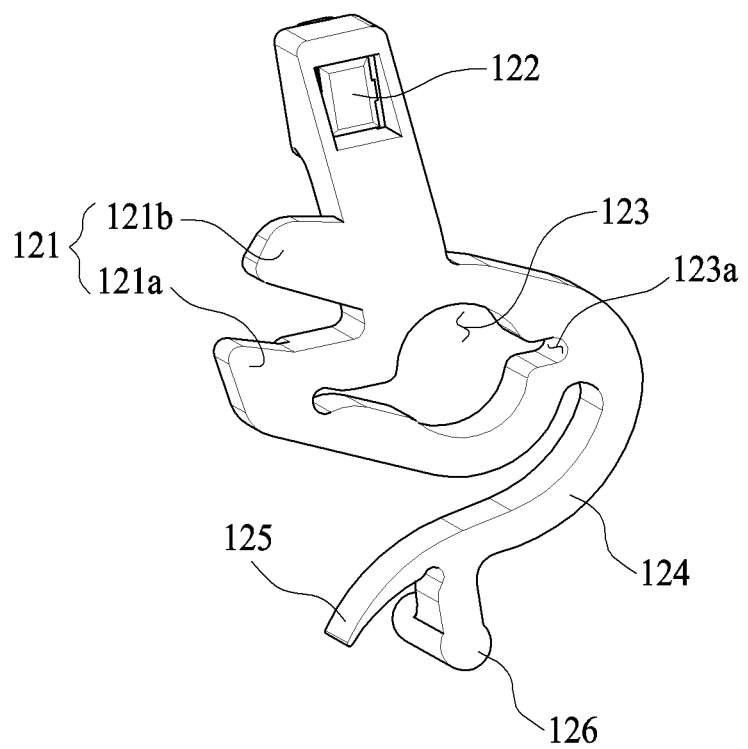
FIG. 7 is a view illustrating a structure of a mode switching lever of the intelligent retractor according to the exemplary embodiment of the present invention.

Next, a structure of the mode switching lever 120 will be described with reference to FIGS. 3 and 7. The mode switching lever 120 is a constituent element that rotates to switch the ALR mode and the ELR mode.

In the present exemplary embodiment, the mode switching lever 120 includes a switching protrusion 121, a fixing holder 126, a first target means 122, and a stopping protrusion 125.

The switching protrusion 121 is formed to protrude toward the flywheel 110, and to be caught by the protruding portion 152 of the disc member 150. Therefore, when the disc member 150 rotates, the protruding portion 152 pushes the switching protrusion 121, thereby rotating the mode switching lever 120.

In particular, in the present exemplary embodiment, the switching protrusion 121 includes a pair of first and second switching protrusions 121a and 121b, which are spaced apart from each other, and is formed to surround the protruding portion 152. Therefore, the mode switching lever 120 may rotate in a direction corresponding to a forward rotation or a reverse rotation of the disc member 150.

When the mode switching lever 120 rotates toward the locking unit 140, the fixing holder 126 pushes a holding portion 142d (see FIG. 8) of the locking lever 142 to be described below, thereby allowing a catching portion 142e (see FIG. 8) of the locking lever 142 to be caught by the first gear teeth 112 of the flywheel 110.

That is, in a case in which the webbing is extended by the predetermined length or greater, the fixing holder 126 switches the mode of the retractor to the ALR mode, thereby preventing the webbing from being extended.

The first target means 122 is provided to allow a first sensing means 174 of the sensing unit 170, which will be described below, to sense a proximity distance, and as a result, a control device such as an ECU may adjust whether to operate an airbag by determining whether the ALR mode is operated.

The stopping protrusion 125 is a constituent element which may restrict a maximum rotation amount of the mode switching lever 120, and for example, the stopping protrusion 125 is caught by a partition wall formed on the main cover 102 (see FIG. 2) in a state in which the mode switching lever 120 is rotated at a predetermined angle, thereby restricting the rotation of the mode switching lever 120.

Meanwhile, the mode switching lever 120 includes a connecting portion 124 that connects the stopping protrusion 125 and the fixing holder 126, and the connecting portion 124 is formed to be rounded, thereby mitigating, by elasticity, external force applied to the stopping protrusion 125 and the fixing holder 126.

A fitting hole 123 is formed at a center of the mode switching lever 120 so that a rotating shaft may be fitted into the fitting hole 123 in an interference fit manner, and extension holes 123a, which may apply tension to the rotating shaft after the rotating shaft is fitted into the fitting hole 123 in an interference fit manner, may be formed at both sides of the fitting hole 123.

Next, a structure of the locking unit 140 will be described with reference to FIGS. 3 and 8 to 11. The locking unit 120 serves to fix the flywheel 110 when the retractor satisfies a predetermined condition for preventing an extension of the webbing.

Specifically, in the present exemplary embodiment, the locking unit 140 includes a housing 141, the locking lever 142, the ball member 143, and a coupling member 144.

A seating groove 141a of which the depth is increased toward a center thereof is formed in the housing 141 so that the ball member 143 may be seated in the seating groove 141a, and the ball member 143 may be moved in the seating groove 141a based on a gradient of the vehicle, thereby operating the locking lever 142.

The locking lever 142 is rotatably provided in the housing 141, and rotated toward the flywheel 110 by the movement of the ball member 143 or the rotation of the mode switching lever 120 (see FIG. 7) such that the locking lever 142 is caught by the first gear teeth 112. To this end, the locking lever 142 may include the holding portion 142d which may come into contact with the fixing holder 126 of the mode switching lever 120, and the catching portion 142e which may be caught by the first gear teeth 112.

The pressed portion 142a, which corresponds to a shape of an end of the pressing portion 135 of the noise removal unit 130 (see FIG. 6), may be formed on an upper surface of the locking lever 142, thereby minimizing damage to the pressing portion 135.

Meanwhile, the coupling member 144 includes an inclined portion 144b which is detachably provided at one side of the housing 141, and formed to be inclined relatively at a predetermined angle θ2 with respect to a horizontal state of the housing 141. The inclined portion 144b serves to set a vehicle mounting angle of the locking unit 140, and to this end, a plurality of coupling members 144 having different inclination angles may be selectively coupled to the housing 141.

That is, the present invention may minimize manufacturing costs and satisfy a required mounting angle of the locking unit 140 only by manufacturing the coupling members 144 having various shapes and by changing the coupling members 144.

In particular, in the present exemplary embodiment, a dovetailed coupling protrusion 141b is formed on the housing 141, and a coupling groove 144a into which the coupling protrusion 141b is fitted in a sliding manner is formed in the coupling member 144, so that the housing 141 and the coupling member 144 may be easily coupled and separated.

Boss portions 141c and 144c, which are formed coaxially with each other, are formed on the housing 141 and the coupling member 144, respectively, and as a result, it is possible to easily adjust the mounting angle of the locking unit 140 by using the boss portions 141c and 144c as an axis.

Figure 10:
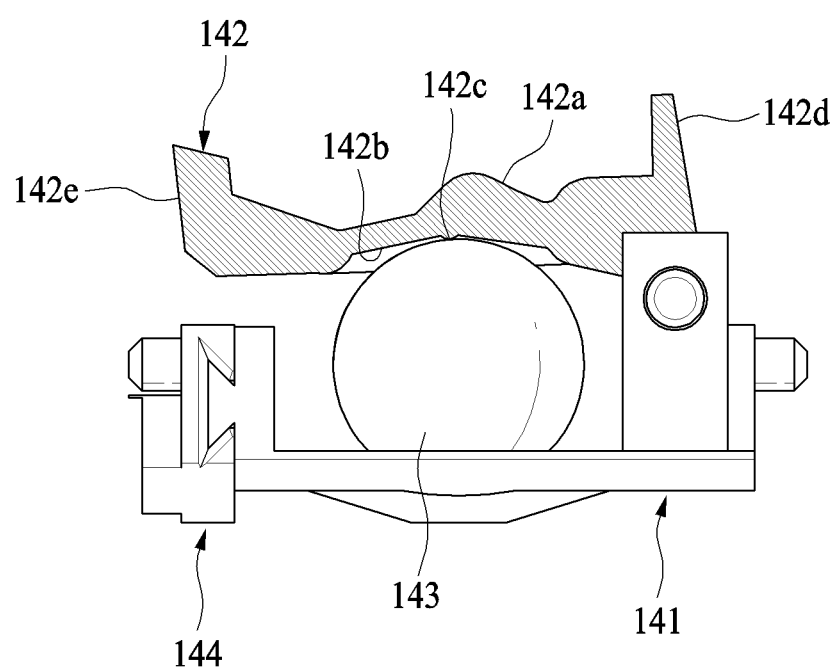

As illustrated in FIG. 10, in the present exemplary embodiment, a depressed portion 142b, which is depressed so that a part of the ball member 143 is inserted into the depressed portion 142b, is formed in the locking lever 142, and the depressed portion 142b may include a pressing protrusion 142c which is formed to come into point-to-point contact with the ball member 143 and forms a gap between the locking lever 142 and the ball member 143. This is to prevent a doughnut-shaped oil film from being formed in a state in which the ball member 143 is pressed by the locking lever 142.

Figure 11:
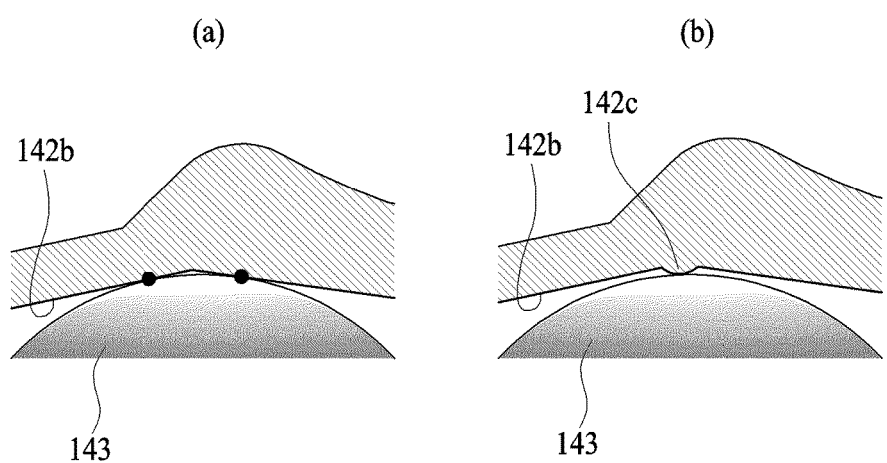

That is, in a case in which no pressing protrusion 142c is provided as illustrated in (a) of FIG. 11, the depressed portion 142b is in line-to-line contact with an upper circumference of the ball member 143, and a doughnut-shaped oil film may be formed if the aforementioned phenomenon is repeated under a high-humidity environment.

A pressure field is formed in a hermetic space in the linear contact portion, and as a result, mobility of the ball member 143 deteriorates such that a delay of the locking unit 140 is increased.

Therefore, in the present exemplary embodiment, since the pressing protrusion 142c is formed on the depressed portion 142b as illustrated in (b) of FIG. 11, it is possible not only to prevent a doughnut-shaped oil film from being formed, but also to maintain mobility of the ball member 143, thereby maximizing performance of the locking unit 140.

Next, the sensing unit 170 will be described with reference to FIG. 3. As illustrated in FIG. 3, the sensing unit 170 is provided to be adjacent to the flywheel 110 and the mode switching unit 120, and includes the first sensing means 174 and a second sensing means 172.

The first sensing means 174 is a constituent element which senses the first target means 122 (see FIG. 7) of the mode switching lever 120 in a state in which the webbing is extended by the predetermined length or greater as described above, and the second sensing means 172 is a constituent element which is disposed to be adjacent to the magnetic portion 136 of the noise removal unit 131 or the second target means 115 formed along the circumference of the flywheel 110 and senses a rotational speed of the flywheel 110.

That is, the sensing unit 170 transmits a sensing result from the first sensing means 174 and the second sensing means 172 to the ECU, and the ECU performs a control operation to set a function appropriate to the current retractor mode.

As the foregoing, the respective constituent elements of the present invention have been described in detail, and the retractor functions of the present invention, which may be implemented by the respective constituent elements, will be described below.

First, the retractor according to the exemplary embodiment of the present invention may identify an occupant such as adult persons, old or weak persons, children, and female persons by measuring a rotational speed of the spool, and as a result, it is possible to set a function appropriate for the occupant such as the airbag deployment for each situation.

Figure 12:
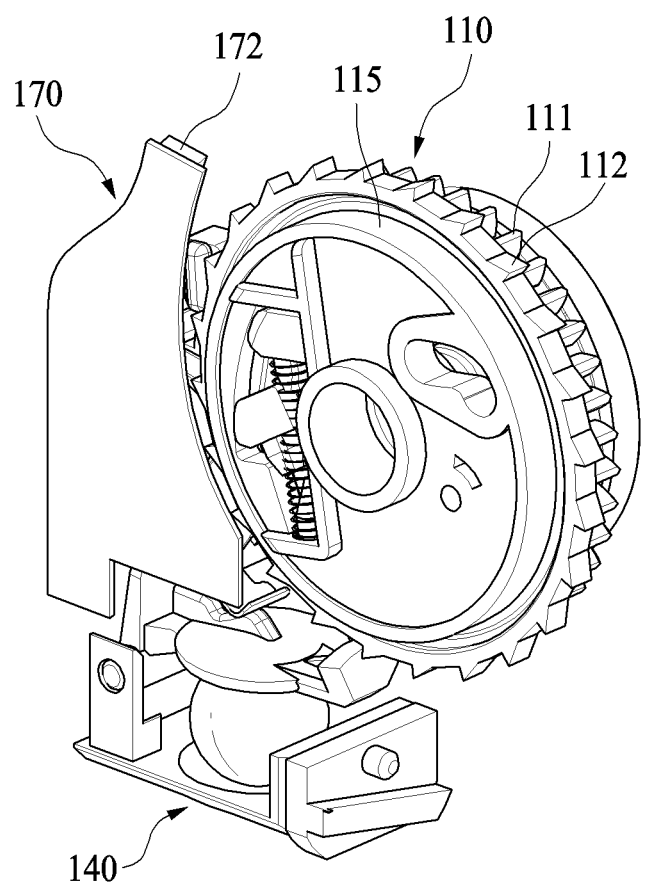
FIG. 12 is a view illustrating a configuration for recognizing a user's body size in the intelligent retractor according to the exemplary embodiment of the present invention.

As illustrated in FIG. 12, the second sensing means 172 of the sensing unit 170 may sense the rotational speed of the flywheel 110 by using the ring-shaped second target means 115 provided on the flywheel 110. That is, the extension amount of the webbing may be determined through the rotational speed of the flywheel 110, and as a result, the user's body size may be also obtained.

Through the aforementioned processes, it is possible to determine whether the user is an adult person or a child, and as a result, the ECU may set deployment pressure of an airbag and whether to operate a load limiter based on the user such as an adult person or a child.

Next, the retractor according to the exemplary embodiment of the present invention may determine whether the current state is the ALR mode state or the ELR mode state, and accordingly, may set a function appropriate to each mode.

Figure 13:
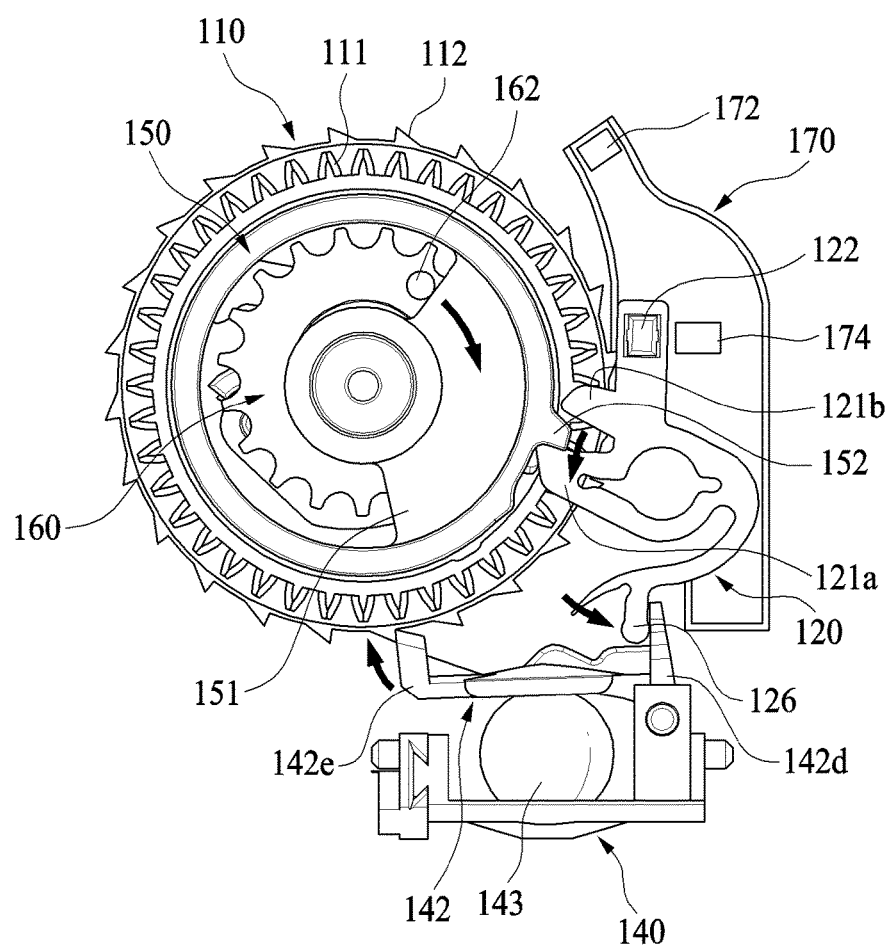
FIGS. 13 and 14 are views illustrating a state in which a mode switching unit of the intelligent retractor according to the exemplary embodiment of the present invention is operated.

FIG. 13 illustrates a state in which the extension amount of the webbing is equal to or larger than a reference amount, and illustrates a state in which the catching protrusion 162 of the rotating member 160, which rotates along with the rotation of the flywheel 110, rotates the mode switching lever 120 by pushing a shielded region 151 of the disc member 150.

In this state, the mode switching lever 120 rotates toward the locking unit 140 such that the fixing holder 126 presses the holding portion 142d of the locking lever 142, and the locking lever 142 rotates such that the catching portion 142e is caught by the first gear teeth 112 of the flywheel 110. That is, this is a state in which a child seat is mounted in a seat, and the mode is switched to the ALR mode.

In this case, the first sensing means 174 of the sensing unit 170 may determine a separation distance from the first target means 122 of the mode switching lever 120, and may transmit, to the ECU, information that the mode has been switched to the ALR mode, and as a result, the ECU may set the prevention of an operation of the airbag of the corresponding seat.

Figure 14:
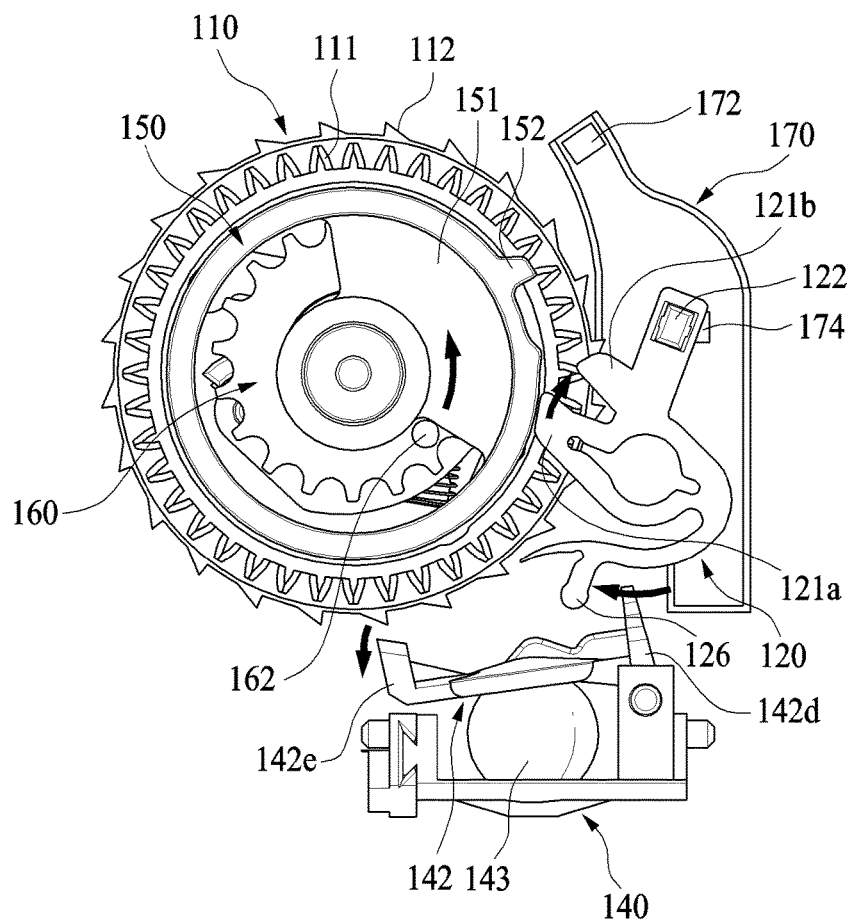

FIG. 14 illustrates a state in which the extension amount of the webbing is smaller than the reference amount, and illustrates a state in which the catching protrusion 162 of the rotating member 160, which rotates along with the rotation of the flywheel 110, rotates the mode switching lever 120 in the reverse direction by pushing a region opposite to the shielded region 151 of the disc member 150.

In this state, the mode switching lever 120 rotates toward a portion opposite to the locking unit 140 such that the fixing holder 126 releases the pressed holding portion 142d of the locking lever 142, and the catching portion 142e of the locking lever 142 is withdrawn from the first gear teeth 112 of the flywheel 110. That is, this is a state in which the mode is switched to the ELR mode, and only in a state in which the retractor satisfies the predetermined condition for preventing the extension of the webbing, the locking lever 142 rotates by the ball member 143 so as to prevent the webbing from being extended.

Through the aforementioned processes, the current mode state may be recognized, and as a result, the ECU may determine functions corresponding to the modes.

Next, the retractor according to the exemplary embodiment of the present invention may implement a function of preventing noise caused by rattling of the locking unit 140.

Figure 15:
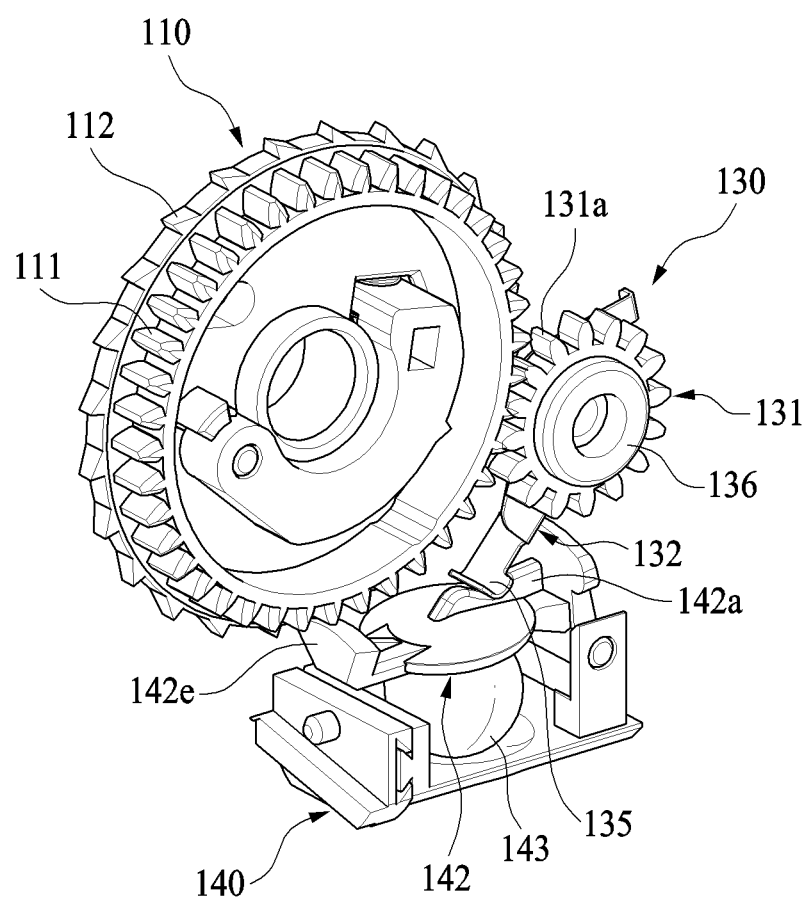
FIGS. 15 to 17 are views illustrating a state in which the noise removal unit of the intelligent retractor according to the exemplary embodiment of the present invention is operated.

As illustrated in FIG. 15, the rotating member 131 of the noise removal unit 130 meshes with the second gear teeth 111 of the flywheel 110, and as a result, the pressing member 132 selectively presses the locking lever 142 in accordance with the rotation direction of the rotating member 131.

Figure 16:
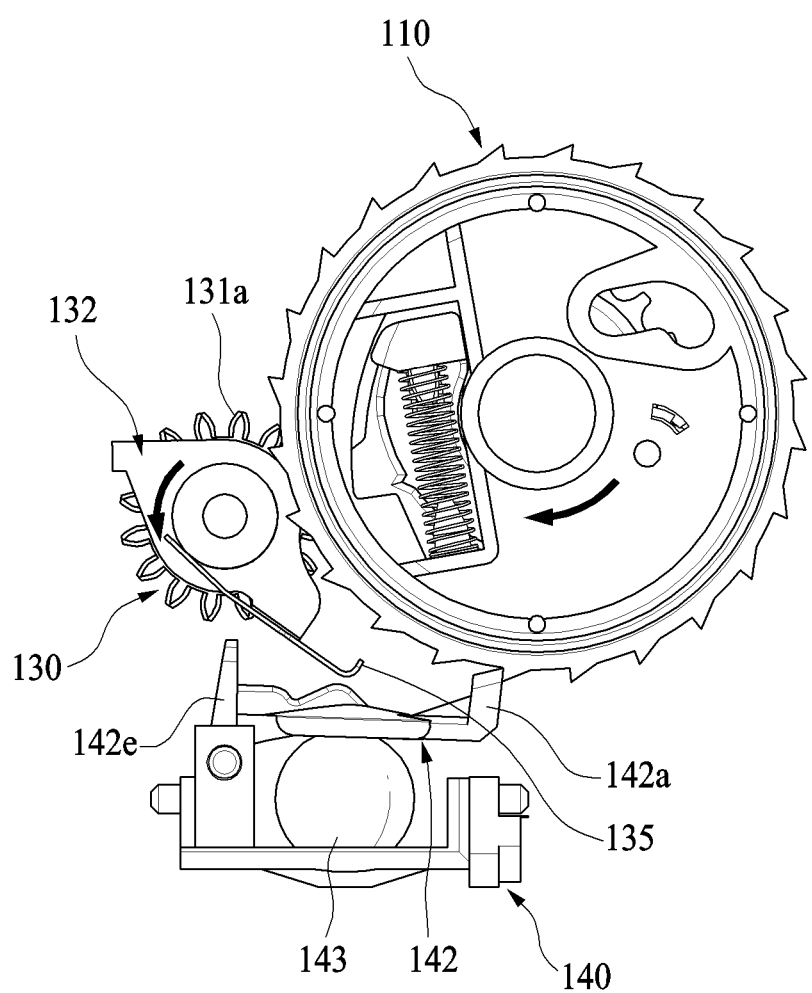

Specifically, as illustrated in FIG. 16, when the flywheel 110 rotates in a direction in which the webbing is extended, the rotating member 131 is rotated together with the flywheel 110 in a direction in which the pressing portion 135 of the pressing member 132 is withdrawn from the locking lever 142.

Because the time for which the rotating member 131 of the noise removal unit 130 releases the pressed locking lever 142 may have a great effect on safety in the case of emergency, the gear teeth, which mesh with the second gear teeth 111 of the flywheel 110, are disposed at the circumference of the rotating member 131 as a means for maximizing an effect of instantaneously releasing the locking lever 142 when extending the webbing, and thus a rotation ratio is increased, and as a result, it is possible to obtain a high response speed in releasing the locking lever 142.

Figure 17:
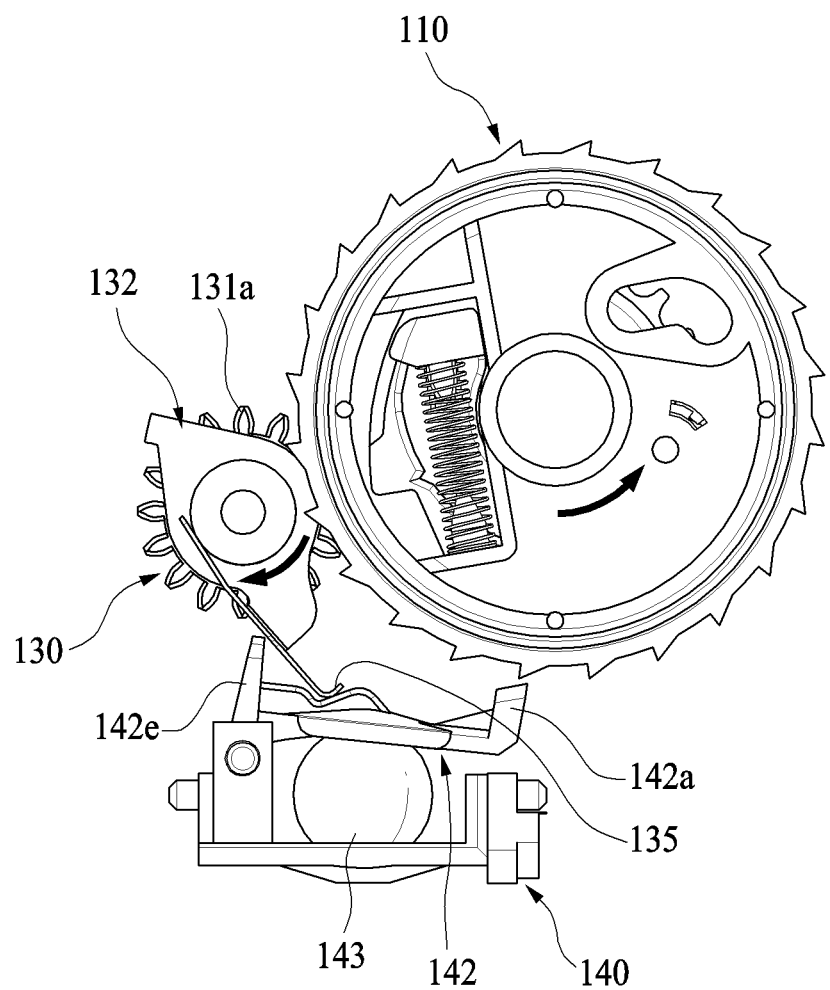

As illustrated in FIG. 17, when the flywheel 110 rotates in a direction in which the webbing is retracted, the rotating member 131 rotates the pressing portion 135 of the pressing member 132 toward the locking lever 142, and as a result, the pressing portion 135 presses the locking lever 142, thereby preventing the movement of the ball member 143.

That is, since the pressing member 132 presses the locking lever 142 in a state in which the webbing is retracted, it is possible to prevent vibration of the ball member 143. Therefore, the present invention may basically prevent operational noise of the retractor.

Figure 6:
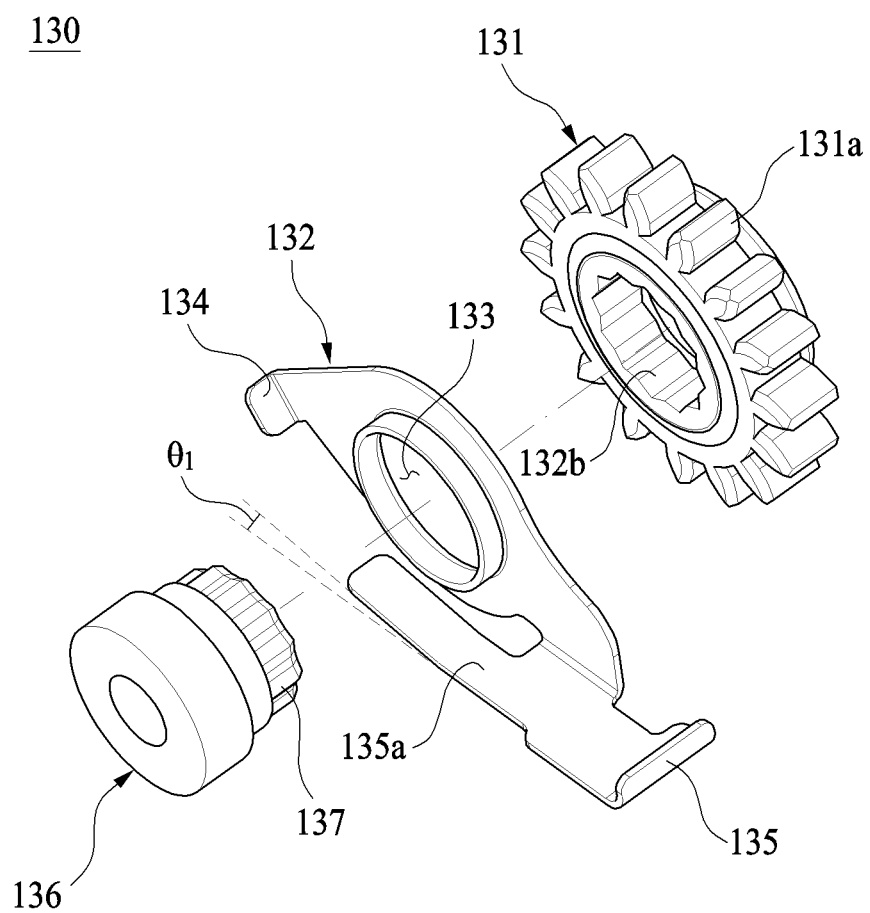
FIG. 6 is a view illustrating a structure of a noise removal unit of the intelligent retractor according to the exemplary embodiment of the present invention.

Meanwhile, as described above, in the present exemplary embodiment, the pressing member 132 is formed to be rotatable independently of the rotating gear 131, and the magnetic portion 136 of the pressing member 132 applies a load to the tension generating portion 135a (see FIG. 6).

Therefore, in a case in which predetermined or higher external force is applied to the pressing portion 135 during the process in which the flywheel 110 rotates in the forward direction or the reverse direction, the flywheel 110 may idle.

As described above, the present invention may implement various functions such as an automatic locking retractor function, an emergency locking retractor function, a function of identifying an occupant, and a function of removing noise, by using a single retractor, and may reduce a weight because of a simple structure and minimize a failure rate.

While the exemplary embodiments according to the present invention have been described above, it is obvious to those skilled in the art that the present invention may be specified in other particular forms in addition to the aforementioned exemplary embodiments without departing from the spirit or the scope of the present invention. Accordingly, it should be understood that the aforementioned exemplary embodiments are illustrative and not restrictive, and thus the present invention is not limited to the aforementioned description, and may be modified within the scope and the equivalent range of the appended claims.

What is claimed is:

1. An intelligent retractor comprising:
a spool around which webbing is wound;

a flywheel which is provided at one side of the spool and rotates along with the rotation of the spool;

a locking unit which fixes the flywheel when a predetermined condition for preventing an extension of the webbing is satisfied; and a noise removal unit which rotates along with the rotation of the flywheel when the webbing is retracted, and prevents vibration from being generated in the locking unit, wherein first gear teeth are formed at a circumference of the flywheel, the locking unit includes a housing, and a locking lever rotatably provided in the housing, and fixes the flywheel as the locking lever is caught by the first gear teeth when the predetermined condition for preventing an extension of the webbing is satisfied, and the noise removal unit rotates along with the rotation of the flywheel when the webbing is retracted, and presses the locking lever so as to prevent vibration from being generated in the locking unit, and wherein second gear teeth are formed at a circumference of the flywheel, and the noise removal unit includes a rotating gear which meshes with the second gear teeth, and a pressing member which presses the locking lever by the rotation of the rotating gear.

2. The intelligent retractor of claim 1, wherein the noise removal unit further includes a magnetic portion which is connected to the rotating gear and rotates together with the rotating gear, and the pressing member includes a pressing portion which extends to press the locking lever, and a tension generating portion which is made of a magnetic material and disposed to be adjacent to the magnetic portion so as to generate tension.

3. The intelligent retractor of claim 2, wherein the tension generating portion is connected to the pressing portion at an inclined angle.

4. The intelligent retractor of claim 2, wherein an end of the pressing portion is formed to be rounded, and a pressed portion, which corresponds to the shape of the end of the pressing portion, is formed on an upper surface of the locking lever.

5. The intelligent retractor of claim 1, further comprising:
a mode switching lever which rotates in a state in which the webbing is extended by a predetermined length or larger, and operates the locking unit so that the locking unit fixes the flywheel.

6. The intelligent retractor of claim 5, further comprising:
an auxiliary rotating unit which rotates the mode switching lever in a state in which the webbing is extended by the predetermined length or larger.

7. The intelligent retractor of claim 6, wherein the mode switching lever includes a switching protrusion, and the auxiliary rotating unit includes a rotating member which shares the same rotation axis with the flywheel and rotates along with the rotation of the flywheel, and a disc member which rotates the mode switching lever by pushing the switching protrusion in accordance with a rotation angle of the auxiliary rotating member.

8. The intelligent retractor of claim 1, wherein the locking unit further includes a ball member which is provided between the housing and the locking lever, and rotates the locking lever in accordance with a gradient of a vehicle so that the locking lever is caught by the first gear teeth, and the locking lever has a depressed portion which is depressed such that a part of the ball member is inserted into the depressed portion.

9. The intelligent retractor of claim 8, wherein the depressed portion includes a pressing protrusion which is formed to come into point-to-point contact with the ball member, and forms a gap between the locking lever and the ball member.

10. The intelligent retractor of claim 1, wherein the locking unit further includes a coupling member which includes an inclined portion that is detachably provided at one side of the housing and formed to be inclined with respect to a horizontal state of the housing.

11. An intelligent retractor comprising:
a spool around which webbing is wound;
a flywheel which is provided at one side of the spool and rotates along with the rotation of the spool;
a locking unit which fixes the flywheel when a predetermined condition for preventing an extension of the webbing is satisfied; and
a noise removal unit which rotates along with the rotation of the flywheel when the webbing is retracted, and prevents vibration from being generated in the locking unit,
wherein first gear teeth are formed at a circumference of the flywheel, the locking unit includes a housing, and a locking lever rotatably provided in the housing, and fixes the flywheel as the locking lever is caught by the first gear teeth when the predetermined condition for preventing an extension of the webbing is satisfied, and the noise removal unit rotates along with the rotation of the flywheel when the webbing is retracted, and presses the locking lever so as to prevent vibration from being generated in the locking unit,
wherein the locking unit further includes a ball member which is provided between the housing and the locking lever, and rotates the locking lever in accordance with a gradient of a vehicle so that the locking lever is caught by the first gear teeth, and the locking lever has a depressed portion which is depressed such that a part of the ball member is inserted into the depressed portion, and
wherein the depressed portion includes a pressing protrusion which is formed to come into point-to-point contact with the ball member, and forms a gap between the locking lever and the ball member.

12. An intelligent retractor comprising:
a spool around which webbing is wound;
a flywheel which is provided at one side of the spool and rotates along with the rotation of the spool;
a locking unit which fixes the flywheel when a predetermined condition for preventing an extension of the webbing is satisfied; and
a noise removal unit which rotates along with the rotation of the flywheel when the webbing is retracted, and prevents vibration from being generated in the locking unit,
wherein first gear teeth are formed at a circumference of the flywheel, the locking unit includes a housing, and a locking lever rotatably provided in the housing, and fixes the flywheel as the locking lever is caught by the first gear teeth when the predetermined condition for preventing an extension of the webbing is satisfied, and the noise removal unit rotates along with the rotation of the flywheel when the webbing is retracted, and presses the locking lever so as to prevent vibration from being generated in the locking unit, and
wherein the locking unit further includes a coupling member which includes an inclined portion that is detachably provided at one side of the housing and formed to be inclined with respect to a horizontal state of the housing.

* * * * *